US012681325B2

(12) United States Patent
Pellicer Ramo

(10) Patent No.: US 12,681,325 B2
(45) Date of Patent: Jul. 14, 2026

---

(54) HINGE SYSTEM FOR EYEGLASSES

(71) Applicant: ETNIA EYEWEAR CULTURE S.L.,
Barcelona (ES)

(72) Inventor: David Pellicer Ramo, Barcelona (ES)

(73) Assignee: ETNIA EYEWEAR CULTURE S.L.,
Barcelona (ES)

( * ) Notice: Subject to any disclaimer, the term of this
patent is extended or adjusted under 35
U.S.C. 154(b) by 743 days.

(21) Appl. No.: 17/945,421

(22) Filed: Sep. 15, 2022

(65) Prior Publication Data

US 2023/0093475 A1     Mar. 23, 2023

(30) Foreign Application Priority Data

Sep. 21, 2021     (EP) ...................................... 21382849

(51) Int. Cl.
G02C 5/22                (2006.01)

(52) U.S. Cl.
CPC ......... G02C 5/2254 (2013.01); G02C 5/2209
(2013.01)

(58) Field of Classification Search
CPC . G02C 5/2254; G02C 5/2209; G02C 2200/20
See application file for complete search history.

(56) References Cited

U.S. PATENT DOCUMENTS

| 3,427,681 A | 2/1969 | Smith, Jr. | |
| 2007/0279580 A1* | 12/2007 | Breda | G02C 5/2263 |
| | | | 351/115 |
| 2013/0000077 A1 | 1/2013 | Thompson | |
| 2020/0241319 A1 | 7/2020 | Pol et al. | |

FOREIGN PATENT DOCUMENTS

| CN | 202306037 U | * | 7/2012 | ........... G02C 5/2227 |
| FR | 2990030 A1 | * | 11/2013 | ........... G02C 5/2254 |
| FR | 2991467 A1 | * | 12/2013 | ............... G02C 1/08 |
| JP | 4414791 B2 | | 2/2010 | |
| WO | 2015044610 A2 | | 4/2015 | |

OTHER PUBLICATIONS

Extended European Search Report issued on Mar. 15, 2022, in
connection with corresponding European Application No. 21382849.
4, 9 pages.

* cited by examiner

*Primary Examiner* — Sharrief I Broome
*Assistant Examiner* — K Muhammad
(74) *Attorney, Agent, or Firm* — Maier & Maier, PLLC

(57)            ABSTRACT

A hinge system for eyeglasses, including: a first hinge
element, including a first end and a second end, where the
first end includes a retention element; and the second end
includes a first hole that extends between two opposite faces
of the first hinge element; a second hinge element, including
an aperture for receiving the first hinge element; and a
second hole that extends from a face of the second hinge
element to the aperture, where the first and second hinge
elements form a hollow cavity; a pin at least partially
engaged in the hollow cavity; and a lamellar element,
including an aperture, where at least a part of the lamellar
element is between the retention element and the second
hinge element.

18 Claims, 5 Drawing Sheets

HINGE SYSTEM FOR EYEGLASSES

TECHNICAL FIELD

The present disclosure concerns a hinge system for eyeglasses. The invention also concerns an eyeglass frame incorporating said hinge system, and a method of assembly of the hinge system in an eyeglass frame.

BACKGROUND

Some types of hinges are commonly employed for the folding of eyeglasses, allowing the reduction of the space required for the eyeglasses' storage or transport. Several different types of hinge systems are known, such as spring or barrel hinges, among others. Particularly, barrel hinges, also known as standard hinges, often comprise two hinge elements having metal rings, wherein the metal rings of the two hinge elements are interleaved, and a small screw that is inserted in the cavity formed by the interleaved metal rings, holding the hinge elements together. Frequently, the screw in these types of hinges easily loosens and may fall off, especially during carrying out activities that involve an increased user movement. Additionally, having to insert and tighten the small screw during the assembly of the hinge often leads to the slipping of the screwdriver and the damage of eyeglasses frame parts.

Furthermore, for some hinges often the rotation of the hinge becomes less smooth and requires lubrication for obtaining a better performance due to the wear out of the hinge elements or the need for readjustment. On the other hand, since typically the hinge elements are linked to the eyeglasses frame by means of small screws, when the hinge requires substitution, it may have to be detached or reattached to the eyeglass frame which in turn may be damaged this way.

EP3824340 A1 describes a spectacle frame having a central part and two spectacle arms, wherein the central part the spectacle arms each have hinge end regions which are bent to form loops, and which engage around a common hinge pin in a form-fitting manner and in a movable manner relative to one another.

US2015055079 A describes a device comprising an eyewear frame, a link coupled to the eyewear frame for pivoting about a first vertical axis, and an arm coupled to the link for pivoting about a second vertical axis, wherein the connections with the link may further comprise a pin.

EP2645153 B1 describes a coupling structure of glasses frames and temples which includes a hinge piece tightly inserted between end pieces, wherein the hinge piece has a stopper groove; an elastic member having a slot for the insertion of the hinge piece; and temples having a rotation pin and an operating slot such that a front end of the temples can be fitted into the stopper groove while elastically pressing the elastic member.

An alternative hinge system that allows avoiding the use of screws, which is easy to assemble, and provides a reduced wear out of the elements compared to standard hinges may greatly benefit the eyeglasses users and the optical industry.

SUMMARY

In accordance with various embodiments, a hinge system for eyeglasses is provided. There are also provided an eyeglass frame comprising said hinge system, and a method of assembly of the hinge system in the eyeglass frame.

A first aspect of the invention concerns a hinge system for eyeglasses, comprising: a first hinge element, comprising a first end and a second end, wherein the first end comprises retention means for retaining the first hinge element, and the second end comprises a first hole that extends between two opposite faces (e.g. surfaces or sides) of the first hinge element; a second hinge element, comprising an aperture for receiving the first hinge element (i.e., the aperture is a space especially configured for receiving the first hinge element), and a second hole that extends from a face of the second hinge element to the aperture; wherein the first and second hinge elements are configured in such a way that, when the second end of the first hinge element goes through the aperture of the second hinge element, the first and the second hole are axially alignable (i.e. can be aligned) with respect to each other forming a hollow cavity; a pin at least partially engaged in the hollow cavity; and a lamellar element (preferably configured as an elastic element), comprising an aperture, wherein, when at least a part of the lamellar element is between the retention means and the second hinge element, a surface (e.g. a front surface) of the lamellar element is configured to make sliding contact with a periphery (or lateral surface) of the second hinge element. In preferred embodiments, the opposite faces of the first hinge element are arranged substantially parallel to each other.

The hinge system of the present invention solves the aforementioned problems. The hinge system can easily be assembled/added in an eyeglasses frame without the need of using screws or screwdrivers, consequently reducing the time of assembly compared to standard hinge systems, which may be of great value for the optical (eyewear) industry. Since no screws are used for the assembly of the hinge system in an eyeglass frame, the potential risk of damaging eyeglass frame parts by a potential slipping of a screwdriver is eliminated. On the other hand, the disassembly of the hinge system can be performed easily, e.g., with the removal of the pin, and any damaged element can be easily substituted. It is common in the state of the art that the hinge elements are fixed permanently, or in a way that makes it difficult to remove the hinge elements (e.g., using screws), to a temple or the front frame. However, in the present invention, at least two of the elements (i.e., the first hinge element and the lamellar element) may advantageously remain as independent pieces/parts upon removal of the pin, thereby allowing an easy replacement/substitution of any of these elements individually, if required.

In some standard previously known hinges, a small screw holds the hinge elements together, however, it may loosen and fall off, especially when carrying out activities that involve an increased user movement. This screw typically is small and makes difficult the assembly and repair of the eyeglasses due to its small size, and due to the fact that a user or a technician has to insert and tighten such a small piece, often leading to the slipping of the screwdriver and the damaging of the eyeglasses frame parts. In the present invention there is no need to use a screwdriver during the assembly/disassembly of the hinge system, consequently reducing the probability of damaging the eyeglass frame parts. Furthermore, in the present invention the loosening and re-tightening of the hinge system in the present invention can be avoided due to the use of the pin.

The applied force that is required for opening (i.e., the movement for arranging the temples in a use position) and/or closing (i.e., the movement for arranging the temples in a position to be stored after use) the temples in an eyeglass frame comprising the hinge system of the present invention is typically determined, or mostly determined, by the friction between the periphery of the second hinge element and the lamellar element. Furthermore, an interaction between the pin, the second end of the first hinge element and the second hinge element may also affect said opening/closing and the related force that needs to be applied.

As a result, it is possible to achieve intermediate positions of the temples between the temples' fully opened and fully closed positions, due to the friction between the periphery of the second hinge element and the lamellar element, and also due to the friction between the pin and the elements with which said pin is in contact. Consequently, if a user selects a position of the temples in an eyeglass frame, (e.g., to adjust the temples around the user's head) these temples may remain in the selected position unless a force is applied for positioning the temples into a different position.

Advantageously, the lamellar element avoids or reduces the wear of the eyeglass frame caused by the interaction between the second hinge element and an eyeglass frame, thereby protecting the frame. This is particularly advantageous because the lamellar element is an independent, which can be very easily replaced, as opposed to the frame (also called front frame). Therefore, the lamellar element may prevent the eyeglass frame (more specifically a rear part of the frame) from contacting the second hinge element. Hence, the lamellar element may serve as an intermediate element between the second hinge element and the eyeglass frame. In preferred embodiments of the invention, the lamellar element is configured as an elastic lamellar element. Thus, for example, the lamellar element may be configured to provide a tensioning force on the pin. For example, the first and second hinge elements may be configured such that, in order to insert the pin through the holes of both hinge elements, the application of a force on the surface of the lamellar element is required to slightly compress the lamellar element, thereby allowing that the holes of both hinge elements become aligned.

Additionally, the lamellar element may be configured to provide a higher or lower coefficient of friction compared to the coefficient of friction of the frame (i.e., the lamellar element may be configured to provide a coefficient of friction different from that of the frame). In preferred embodiments, the lamellar element may be made of a material which provides an absorption of energy and/or a reduction of the coefficient of friction compared to the coefficient of friction resulting from the interaction between the second hinge element and the eyeglass frame. If the lamellar element wears out, it can be easily substituted upon removal of the pin. Further, the lamellar element may be configured for ergonomically adjusting the position of the temples to a specific user without the need of screws as in conventional eyeglasses. Thus, a plurality of lamellar elements with different configurations (e.g., different shape and/or thickness of the surface) may be provided, such that the fully opened (i.e., the position in which a user may wear the eyeglasses comprising a hinge system according to the invention) and/or the fully closed positions (i.e., the position in which the temples of the eyeglasses comprising a hinge system according to the invention are folded to be stored) may be adjusted by merely replacing a lamellar element by another one with a different configuration, as described further below. The fully open position is also referred to as the extended position, and the fully closed position is also referred to as the folded position. Further, each lamellar element of the plurality of lamellar elements may also be geometrically configured to provide different patoscopic angles (i.e., the vertical angle between a temple in the extended position and the frame). Thus, a user of a pair of eyeglasses having a hinge system according to the invention may replace a lamellar element having a given shape/geometric configuration by another lamellar element being configured differently, to autonomously adjust the tilt angle (i.e., the vertical angle of inclination of the lenses in a use position with respect to a vertical plane).

The first hinge element may also be called main hinge element for a better differentiation from the second hinge element, whereas the second hinge element may also be referred to as the further or additional hinge element. The first and second hinge elements are configured such that the first and second holes are axially alignable, i.e., they can (be) aligned with each other, and, upon insertion of the pin, the hinge system enables the rotational movement of the elements that are connected to the first and second hinge elements, i.e., the temples and front frame, respectively. The first and second hinge element may be made of plastic or metal, although metal is preferred since it provides a higher mechanical resistance to the hinge system.

The retention means in the first end of the first hinge element are most preferably configured for retaining the first hinge element against an eyeglass frame, more specifically against the front frame of the eyeglass frame. The retention means allow to retain the first hinge element without the need of screws or permanent fixation means.

In a preferred embodiment, the pin may be made of a polyamide, preferably a nylon, more preferably poly(hexamethylene adipamide). A pin made of polyamide may be of special importance for the reduction of the wear of the elements comprised in the hinge system that are in contact with the pin. The rings of the standard or barrel hinges and the small screw holding them together are typically metallic. The high coefficient of friction between metallic elements often causes the wear (deterioration, damage) of the hinge elements, especially when the hinge elements are adjusted tightly, thereby negatively affecting the hinge's performance and the user experience; and often creating the need for lubricating and/or readjusting the hinge. In contrast, a pin made of polyamide may provide an adequate coefficient of friction with the second end of the first hinge element and second hinge element, which are preferably metallic, during the folding/unfolding of the eyeglass frame, even if the elements are very tight. Therefore, compared to the use of other materials like metals, using a pin made of polyamide may greatly reduce or prevent the deterioration of the hinge elements even if the pin is tightly inserted on the hollow cavity formed by the first and second hinge elements. As it can be understood from the above, the particular type of the polyamides that is preferably used, may further optimize avoiding or preventing the wear of the hinge elements. For the above reasons, the pin is preferably made of nylon, more preferably poly(hexamethylene adipamide) which is commonly referred to as PA66.

In an embodiment of the invention, the pin may comprise a first part and a second part, wherein the first part has a cross-section larger than a cross-section of the second part. The first part may retain the pin against a surface of the second hinge element, thereby rendering the assembly of the hinge system more resilient by reducing the probability of the pin falling. In an embodiment, the first part of the pin and the second part of the pin may be integral/monolithic/monobloc, i.e., the first part of the pin and the second part may form a single body. The pin may be more resilient versus any breakage when the first part and the second part are integral. In an embodiment the second hinge element may comprise an indentation around the second hole for receiving and lodging the first part of the pin. This indentation is optional as is compatible with any of the embodiments of the inventio. The indentation may contribute to rendering the assembly of the hinge system more resilient by reducing the risk of the pin falling out. The indentation also serves the purpose of providing an increased contact surface (thereby distributing any load over a larger surface, such that the effort is reduced) and reducing the exposure of the pin to the external environment (thereby reducing the risk of the pin being damaged or accidentally removed/dislodged when it comes into contact with external elements).

According to an embodiment, the second hinge element may comprise an additional hole for receiving at least partially the pin, wherein preferably the first hole, the second hole and the additional hole are axially alignable, i.e., they can be aligned along an axis that preferably goes through said holes, more preferably through the centers or close to the centers of the holes. The additional hole may receive at least partially the pin, which may constitute an additional supporting point for the pin inside the hollow cavity formed by the first and second hinge elements and thus, may provide higher resilience against the efforts suffered by the pin. The additional hole may switch the type of stress suffered in the pin from shear stress to flexural stress, distributing differently the efforts on the pin and the second hinge element. In those embodiments comprising both the first hole and the additional hole, the second hinge element may be configured to comprise a first platform/shelf comprising the first hole, and a second platform/shelf comprising the additional hole, such that the aperture of the second hinge element is arranged between both platforms/shelfs, which are preferably arranged parallel to each other.

In an embodiment, the retention means may be configured as a base comprising at least a part/portion being perpendicular to both opposite faces of the first hinge element. The base may be configured in any shape or size provided that it allows the first hinge element to be retained against the front frame and thus (e.g., to be retained by a frontal recess according to the description below), the hinge system is retained against the a frame. In some embodiments, the first hinge element may further comprise a second type of retention means (also referred to as additional retention means; wherein the previously presented retention means may be referred to as primary or main retention means), wherein the second type of retention means are preferably configured as protrusions at least partially distributed on a periphery of the first hinge element, wherein further preferably said protrusions are configured to point towards the base, thereby facilitating the insertion by limiting the risk of an accidental removal of the first hinge element. The protrusions may complement the retention of the first hinge element by interacting with an internal face of an aperture on an eyeglass frame and therefore, it may complement the retention of the hinge system, avoiding that the first hinge element moves from its preferable position. The protrusions may preferably point towards the base for preventing the first hinge element come out by engaging more firmly against the internal face of an aperture on the eyeglass frame.

In some embodiments, the base may be configured to be at least partially inserted in a frontal recess arranged in a front side/part of a frame, such that the base fits or engages the frame.

In an embodiment, the lamellar element's surface that is configured to make sliding contact with the periphery of the second hinge element may comprise a surface depression (or recess). The surface depression may increase the contact surface with the periphery of the second hinge element, helping to distribute the efforts on the hinge system as well as providing more stability and resilience to the system. Additionally, the surface depression provides a longer contact path, thereby providing a smoother transition in the movement of the temples. Preferably, the surface depression may be configured for adapting to the shape of the periphery of the second hinge element. Thus, the surface depression may be configured to contact with the periphery of the second hinge element art least partially by form-fitting. Further, the surface depression may be configured for lodging one or more sections of the periphery of the second hinge element. The surface depression of the lamellar element may serve for adjusting the fully open and/or fully closed position of the temples relative to the front of the eyeglasses.

In an embodiment the lamellar element may be made of a material having elastic properties, such as a polyamide, preferably a nylon, more preferably poly(hexamethylene adipamide), and wherein further preferably the second hinge element is metallic. Advantageously, a lamellar element made of polyamide may reduce the wear of the elements comprised in the hinge system, especially the wear between the lamellar element and the second hinge element, wherein the second hinge element may preferably be metallic. The interaction between a second hinge element made of a metallic material and a lamellar element made of a polyamide may provide a suitable resistance to the rotation for the folding of the temples, so that said resistance not being as high as for being detrimental for the eyeglasses or the hinge system performance, nor being as low as for having an undesired rotation of the elements connected to the hinge system. The second hinge element may be further configured to be rotated around the pin to achieve an intermediate position between the extended position (or fully open position) and the folded position (or fully closed). The second hinge element may be configured to remain in the intermediate position until an additional force is applied for the folding/unfolding of the temple, wherein this may be obtained by shaping the surfaces of the periphery of the second hinge element and of the lamellar element to provide such a technical effect. In some embodiments, the second hinge element may be configured to comprise a temple, wherein said temple may be attached to said second hinge element or be an integral part thereof (i.e., being integrated in a single body with the second hinge).

In some embodiments, the lamellar element may be configured to be inserted in a rear recess arranged in a rear side/part of a frame, such that the lamellar element fits or engages the frame.

Further, in an embodiment, the pin and the lamellar element may be made of a polyamide, preferably PA66. In said embodiment, apart from reducing the wear of the elements, a lamellar element and a pin made of a polyamide, preferably PA66, allows to obtain a hinge system with outstanding energy absorption ability, while avoiding the temples from staggering or moving uncontrolledly, which contributes to the durability and resistance of the hinge system.

In an embodiment, the periphery of the second hinge element may comprise a curved section that is configured to make sliding contact with the surface of the lamellar element. The curved section may comprise two end portions, such that the curved section may be configured to extend longitudinally between both end portions. The curved section is especially suitable to provide a smooth sliding contact with the surface depression of the lamellar element. The periphery of the second hinge element may further comprise two lateral sections, wherein the curved section may be arranged between the two lateral sections. Preferably, the curved section may be configured such that at least the end portions protrude from the lateral sections. In some embodiments, the entire curved section may be configured to protrude from the lateral sections. The curved section may be configured to extend around a central axis of the second hole covering an angle in the range 70 to 110 degrees, preferably 80 to 100 degrees, more preferably 90 degrees.

In preferred embodiments, the end portions of the curved section may be configured to fit together with the surface depression, such that when the second hinge element is rotated around the pin to reach an extended position (i.e., a full open position or use position), then one of the end portions of the curved section fits/engages into the surface depression, and such that when the second hinge element is rotated around the pin to reach a folded position (i.e., a full closed position), then the other end portion fits/engages into the surface depression. Thus, this configuration provides a variable contact force between the surface of the lamellar element and the periphery of the second hinge element, such that said contact force is lower when one of the end portions of the curved surface is engaged with the curved depression (i.e., in the extended position or in the folded position), and is higher in any intermediate position in which said end portions are not in contact with the curved depression. This effect contributes to increase the stability of the extended and folded positions, and the instability of transitional positions. This effect is even more notorious when the lamellar element is optionally made of an elastic material, such that the lamellar element is configured to actuate as a contact spring, e.g., providing the system with a tendency to rest in one of the stable positions (i.e., in the extended or in the folded position). The stability of the extended and/or of the folded positions may be improved by configuring the lateral sections such that, for each of said positions, one of the lateral sections is in contact (preferably, in surface contact having an area of contact) with the surface of the lamellar element (e.g., with a lateral part of the surface of the lamellar element not being a part of the surface depression). It is noted that the surface depression may be configured as a curved surface having (and least in its central part/area) a smaller radius of curvature than at least a part/section/portion of the curved section being arranged between its respective end portions. This smaller radius is specifically suitable for fitting the end portions of the curved section, and for reducing the surface of the curved section that remains in contact with the surface depression during the transitions between the extended and the folded positions (and vice versa), thereby reducing the friction only during the transitional movements.

Optionally, the two lateral sections may be configured as two substantially planar sections. More preferably said planar sections may be oblique or orthogonal/perpendicular to each other. Thus, one of the planar sections may be configured to contact with a first planar portion of the surface of the lamellar element when the second hinge element is in the extended position, and/or the other planar section may be configured to contact with a second planar portion of the surface of the lamellar element when the second hinge element is in the folded position, wherein the surface depression may be preferably arranged between the first and second planar portions of the surface of the lamellar element. This configuration improves the stability of the extended and folded position, while reduces the friction during the transitional movement from one position to the other, since the planar surfaces can only make contact while the second hinge element is in one of the stable positions (i.e., the extended and folded positions). The aforementioned curved section that is configured to make sliding contact with the surface of the lamellar element may provide a uniform and smooth folding/unfolding of the glasses and wherein the planar sections may preferably work as delimiting the fully opened and fully closed positions of the temples with rotation angle between 0-90 degrees. The curved section may increase the surface contact with the lamellar element, helping to distribute the efforts on the hinge system as well as providing more stability and resilience to the system.

In an embodiment, the lamellar element may comprise a plurality of lamellar subelements (e.g., two or three or more) configured to be arrange parallel to each other to form a lamellar element. The plurality of lamellar subelements may have different thickness or curvatures (e.g., the curvature of the surface depression), such that multiple ergonomic configurations may be obtained by combining different subelements (e.g., the extended and folded positions may be adjusted or modified). Additionally, when the subelement being arranged to contact with the periphery of the second hinge element is worn out as a result of an intensive use, this subelement may be replaced individually.

In some embodiments, the first and second hinge element may be made of metal, such as stainless steel or aluminium or titanium, and the lamellar element and the pin may be made of a polyamide, specifically nylon, more specifically poly(hexamethylene adipamide).

The invention in its second aspect concerns an eyeglass frame comprising one or two hinge systems as described in any of the embodiments above. The frame (also front frame) of the second aspect is obviously to be intended to be a part of a pair of eyeglasses/spectacles, thereby the second aspect also refers to such eyeglasses comprising the frame and one or two hinge systems according to the invention. The eyeglass frame according to the invention has less probability of having to be repaired since the one or more hinge systems comprise a respective lamellar element that prevents or reduces the wear and tear of the frame (and also of the hinge elements), since the lamellar element is configured to receive any frictional contact force of the contact with the periphery of the second hinge element, this lamellar element being replaceable in case of wearing out. In case of repair or substitution of any element of the eyeglass frame, the one or more hinge systems allow for an easy disassembly upon removal of the one or more pins, without requiring conventional tools. Additionally, the eyeglass frame has a low probability of being damaged during the assembly since preferably and advantageously the hinge system is completely screwless, the first hinge element may be independent, and the temples may be attached to or be an integral part of the second hinge element. The eyeglass frame of the present invention may provide to the user a smooth and uniform folding/unfolding of the temples and may not need lubrication for improving its performance over time due to the reduction of the wear of the elements comprised in the hinge system.

A preferred embodiment of the second aspect of the invention an eyeglass frame comprises one or two hinge systems according to any of the preceding embodiments, wherein the eyeglass frame may further comprise, for each hinge system, a respective aperture configured as a through-hole extending form a front part of the frame to a rear part of the frame, and further configured to receive by insertion the first end and the second end of a respective first hinge element. The frame may also comprise, for each hinge system according to the invention, a respective temple that may be configured to be attached to or to be an integral part of the second hinge element of the respective hinge systems.

In preferred embodiments, each aperture may further comprise a rear recess (also referred to as indentation) arranged in the rear part of the frame and configured to insert (i.e., to receive by insertion) at least partially the respective lamellar element, such that the lamellar element is prevented from passing through the respective aperture towards the frontal part of the frame. In preferred embodiments, the rear recess may be configured to receive the lamellar element by insertion, such that at least a part of the lamellar element protrudes from said rear recess for contacting with the periphery of the second hinge element while protecting the frame. In preferred embodiments, the rear recess is configured such that, when a lamellar element is inserted into said rear recess, the lamellar element is prevented from rotating. Thus, both the lamellar element and the rear recess may have a polygonal shape, such as a triangular shape, or a rectangular shape, or a hexagonal shape, or an octagonal shape.

In some embodiments, each aperture may further comprise a frontal recess arranged in the frontal part of the frame and configured to insert (i.e., to receive by insertion) at least partially the respective retention means, such that the retention means are prevented from passing through the respective aperture towards the rear part of the frame when the respective first hinge element is inserted through the respective aperture.

According to some embodiments, the retention means may be configured as a base comprising at least a part/portion being perpendicular both opposite faces of the first hinge element, wherein the aperture of the eyeglass frame may be configured (e.g., by comprising a frontal recess as described above) for preventing the base from fully passing through the aperture when the corresponding first hinge element is inserted. The aperture may be configured small enough for preventing the perpendicular base from passing through the aperture and big enough for inserting the first hinge element. The lamellar element may be lodged in the rear recess (also referred to as a rear indentation) around the aperture in the eyeglass frame, working as a supporting surface for the lamellar element and the hinge system in general, reducing the distance of the hinge from the front frame of the eyeglass frame and making the structure more compact and solid versus any possible damage by impact. The aperture may be further configured for lodging the perpendicular base in the frontal recess (also referred to as frontal indentation) around the aperture of the frame, in the opposite face to the first indentation around the aperture of the frame.

A third aspect of the invention relates to a method of assembly of a hinge system according to any of the embodiments previously described, in an eyeglass frame which is according to any of previous embodiments previously described. The method comprises the steps of: inserting the second end of the first hinge element through the aperture of the eyeglass frame; inserting the second end of the first hinge element through the aperture of the lamellar element; axially aligning the first and the second holes with respect to each other; and inserting the pin through the hollow cavity formed by the first hinge element and the second hinge element, in such a way that the pin remains engaged in the hollow cavity. In other words, the methods comprises the steps of: inserting the first hinge element through an aperture on the front frame of an eyeglass frame; insert the second end of the first hinge element through the aperture of the lamellar element; inserting the second end of the first hinge element into the aperture of the second hinge element; and inserting the pin in the hollow cavity formed by the first and second hinge elements. Advantageously, the method of assembly does not require the use of screws or screwdrivers, and hence, may facilitate and reduce the time of assembly compared to standard or barrel hinges; it may further reduce the probability of damaging the eyeglass frame in respect to standard or barrel hinges.

In an embodiment in which the aperture further comprises a rear indentation, the method may further comprise fitting the lamellar element at least partially into the rear indentation, after inserting the second end of the first hinge element through the aperture of the frame.

Various modifications and additions can be made to the embodiments discussed without departing from the scope of the invention. For example, while the embodiments described above refer to particular features, the scope of this invention also includes embodiments having different combination of features and embodiments that do not include all of the above-described features.

BRIEF DESCRIPTION OF THE DRAWINGS

A further understanding of the nature and advantages of particular embodiments may be realized by reference to the remaining portions of the specification and the drawings, in which like reference numerals are used to refer to similar components.

DETAILED DESCRIPTION OF THE EMBODIMENTS

Figure 1:
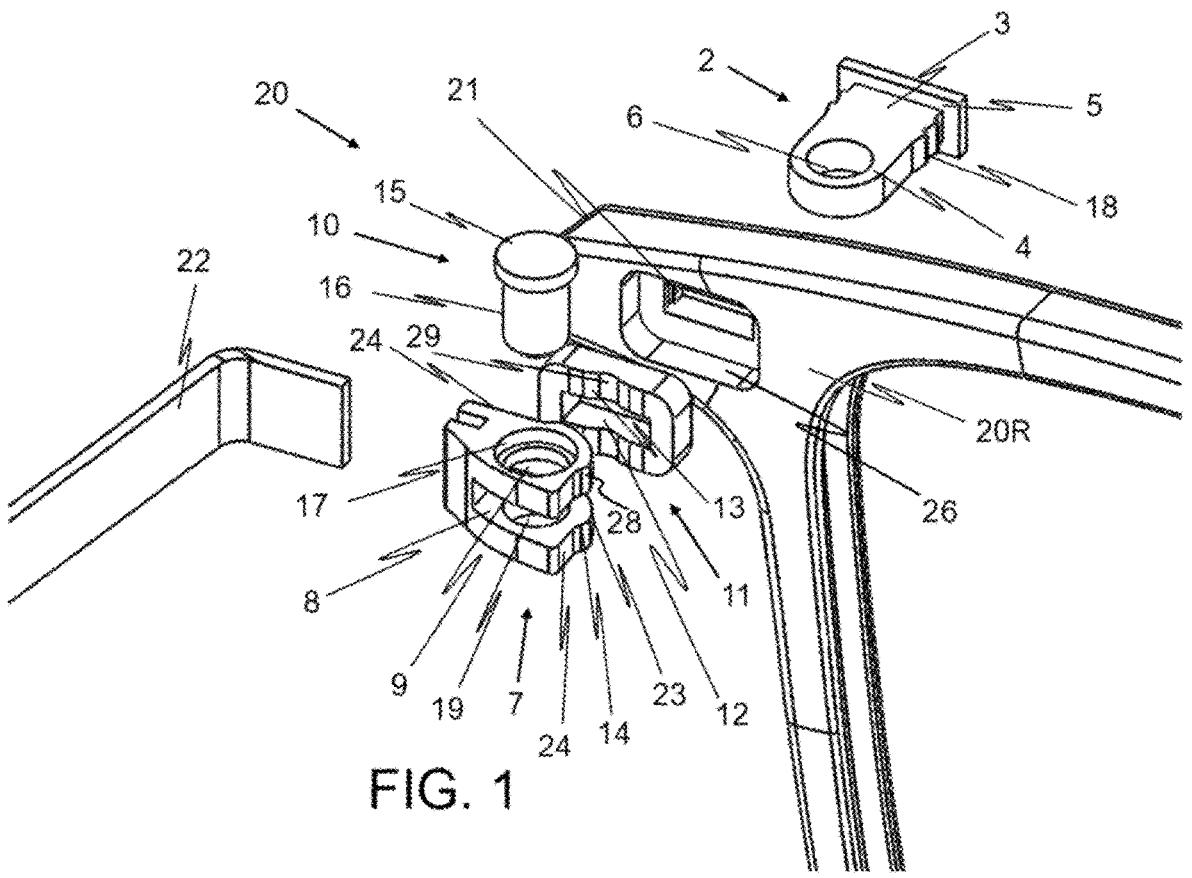
FIG. 1 is a rear exploded view of an embodiment of a hinge system according to the invention, in an eyeglass frame.

Reference is made to FIGS. 1-4 which show rear and front exploded views, respectively, of an embodiment of a hinge system in an eyeglass frame, wherein only a part of the eyeglass frame is shown. As it can be seen in FIG. 1 to 4, the hinge system 1 for eyeglasses, comprises a first hinge element 2, comprising a first end 3 and a second end 4, wherein the first end 3 comprises retention means 5 for retaining the first hinge element 2; and the second end 4 comprises a first hole 6 that extends between two opposite faces of the first hinge element 2; a second hinge element 7, comprising an aperture 8 for receiving the first hinge element 2; and a second hole 9 that extends from a face of the second hinge element to the aperture 8, wherein the first 2 and second hinge 7 elements are configured in such a way that, when the second end 4 of the first hinge element 2 goes through (i.e. it inserts through) the aperture 8 of the second hinge element 7, the first 6 and the second holes 9 are axially alignable with respect to each other forming a hollow cavity; a pin 10 at least partially engaged in the hollow cavity; and a lamellar element 11, comprising an aperture 12, wherein, when the lamellar element 11 is arranged between the retention means 5 and the second hinge element 7, a surface 13 (also referred to as front surface 13) of the lamellar element 11 is configured to make sliding contact with a periphery 14 of the second hinge element 7. It is also depicted that only a part of the lamellar element 11 may be between the retention means 5 and the second hinge element 7. Similarly, it is contemplated that the pin may be partially engaged in the hollow cavity, provided that the pin holds the hinge elements together. The first hinge element 2 shown in the embodiment of FIG. 1 comprises retention means 5 configured as a base being substantially perpendicular to the opposite faces of the first hinge element 2 (both opposite faces being parallel to each other). The first hinge element 2 further comprises additional retention means 18, wherein the additional retention means 18 are configured as protrusions distributed on a periphery of the first hinge element 2, wherein said protrusions are configured to point towards the base. In the shown embodiment, the protrusions 18 serve to hold/retain the first hinge element 2 on the eyeglass frame. It is understood that other types of retention means can be used as first 5 and second 18 retention means, and for fixing the hinge system 1 to the eyeglass frame. In a non-binding example, an elastic band may be arranged around the first end 3 of the first hinge element 1. Likewise, any other element configured to prevent the passage of the first end 3 of the first hinge element 2 through the aperture 21 of the eyeglass frame 20 may be arranged. As it can be understood, the additional retention means 18 are not essential for the retention of the first hinge element 3. The first hinge element 3 may be made of different materials, although in the preferred embodiment of FIG. 1 is preferably made of metal, such as stainless steel or aluminium.

In the embodiment of FIG. 1, the pin 10 comprises a first part 15 and a second part 16, wherein the first part 15 has a cross-section which is larger than a cross-section of the second part 16, and wherein the first part 15 and the second part 16 of the pin 10 are preferably integral. It is envisaged that the first part 15 and the second part 16 may be configured as two independent pieces connected to each other, wherein the first part 15 is a first piece with a larger cross-section than the cross section of the second part 16. In the present embodiment, the pin is made of a polyamide, preferably a nylon, more preferably poly(hexamethylene adipamide), which is commonly referred to as PA66. The second hinge element 7 comprises an optional indentation 17 arranged around the second hole 9 for lodging the first part 15 of the pin 10. The indentation 17 around the second hole 9 is a preferable but not essential feature of the invention and may advantageously contribute to optimising the performance of the hinge system by preventing the pin 10 from accidentally falling off.

The second hinge element 7 in the embodiment of FIG. 1 comprises an additional hole 19 for receiving at least partially the pin 10, wherein the first hole 6, the second hole 9 and the additional hole 19 are axially alignable as a result of the assembly process. It is contemplated the optional case in which the pin 10 may be at least partially inserted in the hollow cavity for holding the elements of the hinge together even when the first hole 6, the second hole 9 and the additional hole 19 are not axially or accurately aligned with each other. In the present embodiment, the additional hole 19 serves as an additional fixation point for the pin 10, however this is an optional feature of the invention. It is noted that the second hinge element is depicted as comprising a first platform/shelf which comprises the first hole 6, and a second platform/shelf which comprises the additional hole 9. Thus, the aperture 8 of the second hinge element 7 is arranged between both platforms/shelfs, the platforms being parallel to each other. It is further noted that the periphery 14 is present in both platforms/shelfs with an identical configuration.

FIG. 1 also shows that the periphery 14 of the second hinge element 7 comprises a curved section 23 that is configured to make sliding contact with the surface 13 of the lamellar element 11. The curved section 23 further comprises two end portions 27 and 28 (see FIG. 4), such that the curved section 23 extends longitudinally between both end portions 27 and 28. The periphery 14 of the second hinge element 7 also comprises two lateral sections 24, wherein the curved section 23 is arranged between the two lateral sections 24. In the shown embodiment, the curved section 23 is configured to protrude (i.e., to protrude in a radial direction with respect to a central axis 9a of revolution of the second hole 9) from the lateral sections 24. In some compatible embodiments, the curved section 23 may be configured such that at least the end portions 27 and 28 protrude from the lateral sections 24. The curved section 24 shown in the figures is configured to extend around the central axis 9a (i.e., a central axis of revolution) of the second hole 9 covering an angle of approximately 90 degrees (although the invention is compatible with the ranges previously provided). The two lateral sections 24 are configured as two substantially planar sections 24 each of which is adjacent to a respective one of two ends of the curved section. The configuration of the lateral sections 24 as planar sections is an optional feature of the invention, in preferred embodiments the lateral sections 24 may be merely configured to have a surface contact with a lateral part of the lamellar element 11 (i.e., a part being not being included in the surface depression 29). Further, said planar sections 24 are arranged substantially orthogonally to each other (although the embodiment is compatible with any of the configurations described in the summary). In the embodiment shown, the curved section 23 is aimed to carry out the sliding contact with the surface 13 of the lamellar element 11, whereas the lateral sections 24 (being planar or not) delimit the rotation of the temples for the extended position E and the folded position. In the embodiment depicted the movement of the second hinge element 7 is limited to the range 0-90 degrees (approximately; although the invention is compatible with other ranges previously disclosed). Also, the shown curved section 23 increases the surface contact with the lamellar element 11, helping to distribute the external forces potentially applied on the hinge system 1 during normal use, as well as providing more stability and resilience to the system. Moreover, the shown curved section 23 may also provide a smooth or uniform folding/unfolding of the temples. The shown planar sections 24 delimit the rotation of the hinge system 1 when the hinge system 1 is installed in an eyeglass frame 20. Also, said planar sections 24 are planar for increasing the surface contact with the lamellar element 11 in the limit positions of rotation, i.e., 0 or 90°, although another morphology for these sections may be used in other embodiments, such as substantially planar or curved configurations. The second hinge element 7 may be made of different materials, although in the preferred embodiment of FIG. 1 is made of metal, more preferably of stainless steel.

In the embodiment of FIGS. 1-4, the surface 13 of the lamellar element 11 that is configured to make sliding contact with the periphery 14 of the second hinge element 7 comprises a surface depression 29. The surface depression 29 increases the surface contact with the periphery 14 of the second hinge element 7, especially when the periphery 14 comprises a curved section 23. In particular, in the embodiment shown in FIGS. 1-4, the end portions 27 and 28 of the curved section 23 are depicted as configured to fit together (i.e., top engage) with the surface depression 29, such that when the second hinge element 7 is rotated (about 90 degrees) around the pin 10 to reach an extended position E (i.e., a full open position or use position), then one 27 of the end portions of the curved section 23 fits into the surface depression 29, and such that when the second hinge element 7 is rotated (about 90 degrees) around the pin 10 to reach a folded position (i.e., a full closed position), then the other end portion 28 fits into the surface depression 29. Thus, this configuration provides a variable contact force between the surface 13 of the lamellar element 11 and the periphery 14 of the second hinge element 7, such that said contact force is lower when one of the end portions 27/28 of the curved surface 23 is engaged with the curved surface depression 29 (i.e., in the extended position E or in the folded position), and is higher in any intermediate position in which said end portions 27/28 are not in contact with the curved surface depression 29. This effect contributes to increase the stability of the extended and folded positions, and the instability of transitional positions. This effect is even more notorious when the lamellar element 11 is optionally made of an elastic material, such that the lamellar element 11 is configured to actuate as a contact spring, e.g., providing the system 1 with a tendency to rest in one of the stable positions (i.e., in the extended or in the folded position). It is noted that the surface depression 29 of the embodiments of FIGS. 1-4 is configured as a curved surface having, in its central area (i.e., in a portion arranged between the two respective end portions 27 and 28), a smaller radius of curvature than a radius of curvature of the curved section 23. In particular, the radius of curvature of the curved surface of the surface depression 29 may be smaller than the radius of curvature of at least a portion/section of the curved section 23 arranged between the two respective end portions 27 and 28 of the curved section. This smaller radius is specifically suitable for fitting the end portions 27 and 28 of the curved section 23, and for reducing the surface of the curved section 23 that remains in contact with the surface depression 29 during the transitions between the extended and the folded positions (and vice versa), thereby reducing the friction only during the transitional movements. Consequently, external forces potentially applied on the lamellar element 11 during normal use may be more evenly distributed when the surface 13 of the lamellar element 11 comprises a surface depression configured to make sliding contact with the periphery 14 of the second hinge element 7.

In the embodiment of FIG. 1 the lamellar element 11 is made of a polyamide, specifically nylon, more specifically poly(hexamethylene adipamide), and the second hinge element 7 is metallic. In other embodiments the lamellar element 11 may be made of any other polyamide or any other nylon. The lamellar element 11 is preferably made of a polyamide and the second hinge element 7 is preferably metallic for providing a higher ratio between robustness of the hinge system 1 and wear out of the elements comprised in the hinge system than standard hinges. This combination of a metallic element and an element made of a polyamide provide a suitable friction and resistance to movement for the performance of the hinge system 1 while the wear of the elements is low, not needing lubrication over long periods of time for improving its performance. In other embodiments, the lamellar element 11 may be made of any other material, preferably from a polymeric material. In embodiments in which the pin 10 and the lamellar element 11 are made of a polyamide, preferably nylon, an adequate friction of the hinge system 1 and a reduced wear and tear of the frame (and of the first and second hinge elements) is provided. The friction required to rotate the second hinge element 7 is determined by the combination of the two elements made of polyamide in the hinge system. That is to say, due to the friction between the periphery 14 of the second hinge element 7 and the lamellar element 11; and between the pin 10 and first 2 and second 7 hinge elements, the hinge system 1 of the present invention may provide a constant and uniform friction during the rotation of the temples 22 in intermediate positions. Therefore, when the claimed hinge system 1 is installed in an eyeglass frame 20, it also prevents the temples 22 from staggering or moving uncontrolledly. Further, the fact of including two hinge elements 2 and 7, the pin 10 and the lamellar element 11 being made of a polyamide, preferably nylon, the pin 10 and the lamellar element 11 being arranged as intermediate elements between the first 2 and second 7 hinge elements of the hinge system 1, provide said system 1 with an outstanding energy absorption capability. The system 1 is able to withstand stresses better than known hinges and avoids or reduces the risk of breaking the hinge.

Figure 2:
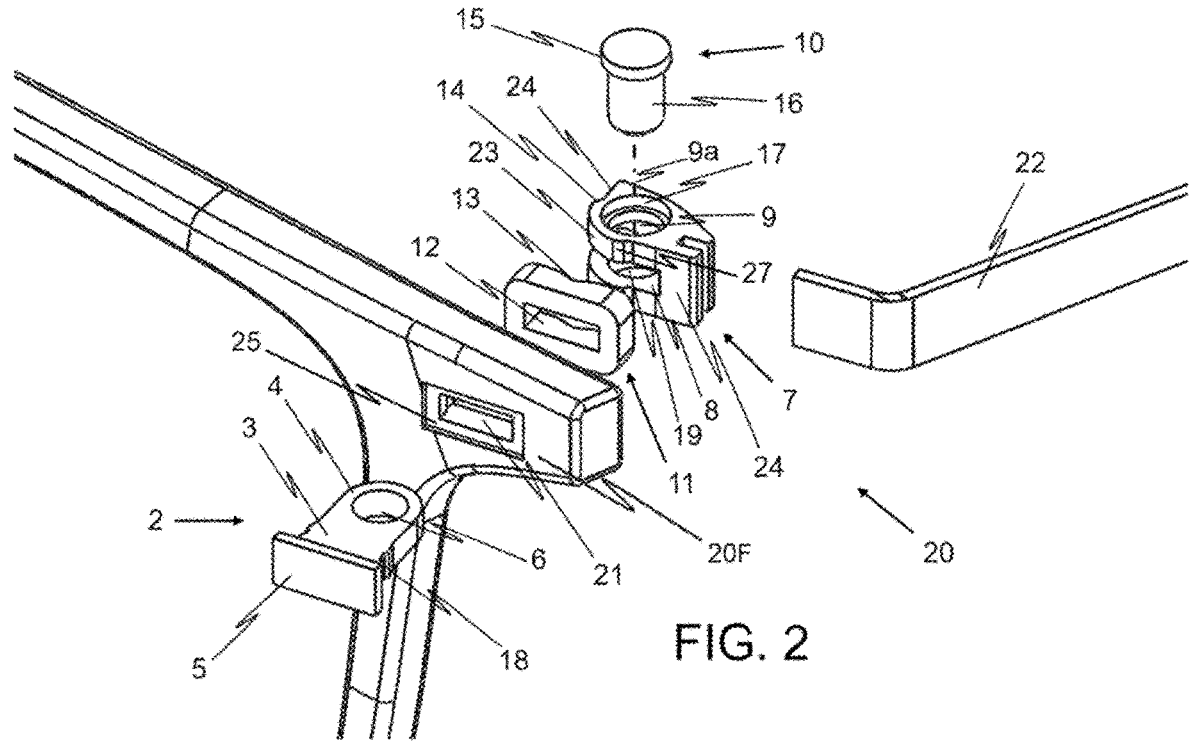
FIG. 2 is a front exploded view of an embodiment of a hinge system according to the invention in an eyeglass frame.
Figure 3:
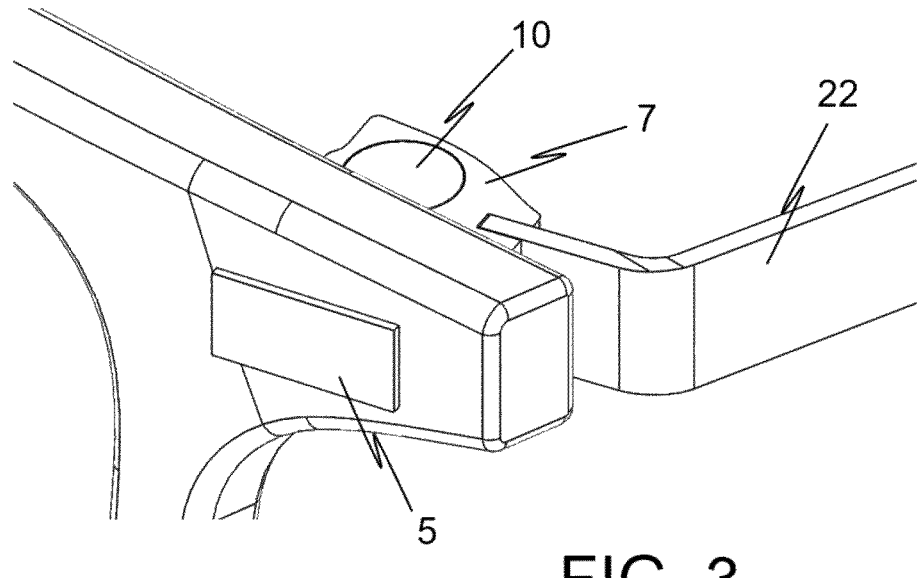
FIG. 3 is a front perspective view of an embodiment of an assembled hinge system according to the invention in an eyeglass frame.

The embodiment of FIG. 1, FIG. 2 and FIG. 3 shows an eyeglass frame 20 that comprises two hinge systems 1 (although only one of the hinge systems 1 is shown). It is contemplated that the eyeglass frame 20 may have one or more hinge systems 1, although the preferred options is that the eyeglass frame 20 comprises two hinge systems 1, one per temple 22). As it can be seen in FIG. 1, the embodiment further comprises: two apertures 21 each of which being configured for allowing the insertion of the first hinge element 2 of a respective one of the two hinge systems 1; and a pair of temples 22 each of which is attached to the second hinge element 7 of the respective one of the hinge systems 1. As a non-limiting example, a temple 22 may be attached to the second hinge element 7 by other means such as welding, gluing, or any other means. It is contemplated that the temples may be integral to the second hinge element 7. The two apertures 21 comprised in the eyeglass frame 20 of the shown embodiment are in the front frame, however, it is also contemplated that the apertures 21 may be in end pieces of the front frame. The shown retention means 5 are configured as a base perpendicular to a geometrical axis passing through the first end 3 and second end 4 of the first hinge element 2, and said aperture 21 of the eyeglass frame 20 is configured for preventing the retention means 5 (e.g., the base) from fully passing through the aperture 21 when the corresponding first hinge element 2 is inserted, the aperture further being configured for lodging the lamellar element 11.

FIGS. 1 and 2 show that the aperture 21 (although only one aperture 21 is depicted, the configuration described is also applicable to a second aperture 21) is configured as a through-hole 21 extending form a front part 20F of the frame 20 to a rear part 20R of the frame 20, and further configured to receive by insertion the first end 3 and the second end 4 of a respective first hinge element 7. The aperture 21 of FIGS. 1 and 2 further comprises a rear recess 26 (also referred to as indentation) arranged in the rear part of the frame 20. The rear recess 26 is configured to insert (i.e., to receive by insertion) at least partially (i.e., at least part of) the respective lamellar element 11, such that the lamellar element 11 is prevented from fully passing through the respective aperture 21 towards the frontal part of the frame 20. The rear recess 26 may also be configured to receive the lamellar element 11 by insertion, such that at least a part of the lamellar element 11 protrudes from said rear recess 26 for contacting with the periphery 14 of the second hinge element 7 while protecting the frame 20. The particular embodiment shown in FIGS. 1 and 2, the rear recess 26 is also configured such that, when a lamellar element 11 is inserted into said rear recess 26, the lamellar element 11 is prevented from rotating within the rear recess 26. Both the lamellar element 11 and the rear recess 26 have a polygonal shape, in particular a square shape, although the invention is compatible with other polygonal configurations, such as a hexagonal shape or an octagonal shape.

Additionally, the aperture 21 depicted in FIGS. 1 and 2 further comprises a frontal recess 25 (also referred to as indentation) arranged in the frontal part of the frame 20 and configured to insert (i.e., to receive by insertion) at least partially the respective retention means 5 (e.g., the base), such that the retention means 5 are prevented from entirely passing through the respective aperture 21 towards the rear part of the frame 20 when the respective first hinge element 2 is inserted through the respective aperture 21.

Therefore, the lamellar element 11 may be configured in some embodiments, as shown in FIGS. 1 and 2, to be inserted in the aperture 21 or in a rear indentation 26 around the aperture 21 in a frame such that the lamellar element 11 fits or engages the frame 20. In other words, the aperture 21 on the eyeglass frame 20 may comprise a rear indentation 26 for lodging, at least partially, the lamellar element 11. When the lamellar element 11 is lodged or fitted in the rear indentation 26 around the aperture 21 in a frame 20, it provides the hinge system 1 with an increased stability and a better energy absorption capability. In these embodiments, the relative movement of the lamellar element 11 with respect to the frame is prevented since the lamellar element 11 backs against the frame 20. The aperture 21 on the eyeglass frame 20 shown is configured to prevent the retention means 5 (e.g., the base 5) from fully passing through the aperture 21, although in the shown embodiment the additional retention means 18 fit tightly to the interior faces of the aperture for retaining the first hinge element 2, so as to provide an optional extra support in this regard. In other embodiments not comprising the additional retention means 18, a section comprised between the first end 3 and the second end 4 of the first hinge element 2 may fit tightly to the aperture 21 on the eyeglass frame 20 for contributing to the retention of the system 1.

The configuration of the hinge system 1 comprising a first hinge element 2 and a second hinge element 7 as described above allows a balanced distribution of the forces over the pin 10. The forces and friction over the pin 10 are evenly distributed since the whole length of the pin 10 may be covered by (i.e., prepared to contact with) the first 2 and second 3 hinge elements. Therefore, the wear of the pin 10 may be also equally distributed.

Figure 6:
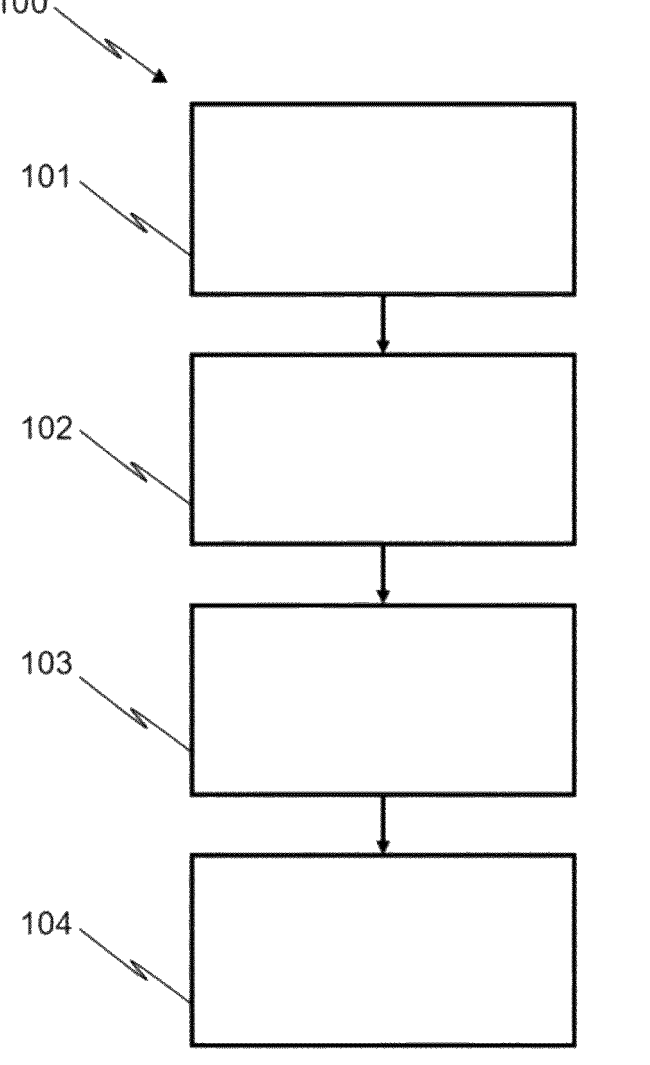
FIG. 6 is a flow diagram of an embodiment of the method according to the invention.

FIG. 3 shows an assembled hinge system 1 in an eyeglass frame 20. The assembled hinge system 1 of FIG. 3 may be assembled following the steps of the preferred embodiment of the method shown in FIG. 6. Said steps are as follows: at step 101 inserting the second end 4 of the first hinge element 2 through the aperture 21 of the eyeglass frame 20; at step 102 inserting the second end 4 of the first hinge element 2 through the aperture 21 of the lamellar element 11; at step 103 axially aligning the first 6 and the second 9 holes with respect to each other; and at step 104 inserting the pin 10 through the hollow cavity formed by the first hinge element 2 and the second hinge element 7, in such a way that the pin 10 remains engaged at least partially in the hollow cavity. In other embodiments, the first hole 6 and the second hole 9 may require the application of a force on the surface 13 of the lamellar element 11, thereby providing a tensioning force configured to secure the pin 10, once inserted. The pin 10 may be inserted at least partially, as far as the pin 10 hold the elements of the hinge system 1 together.

In embodiments in which the aperture or apertures 21 further comprises a rear indentation 26 (as is the case of the embodiment depicted in FIG. 1), the method may further comprise fitting the lamellar element 11 at least partially into the rear indentation 26, after inserting the second end 3 of the first hinge element 2 through the aperture 21 of the lamellar element.

Figure 4:
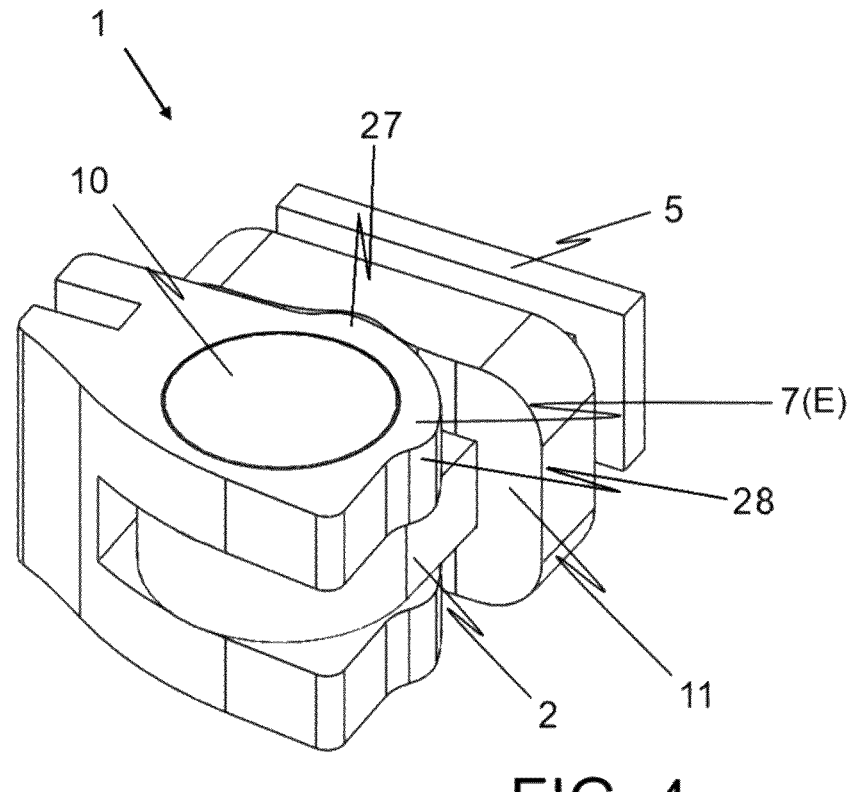
FIG. 4 is a rear perspective view of the assembled hinge system of FIG. 3.
Figure 5:
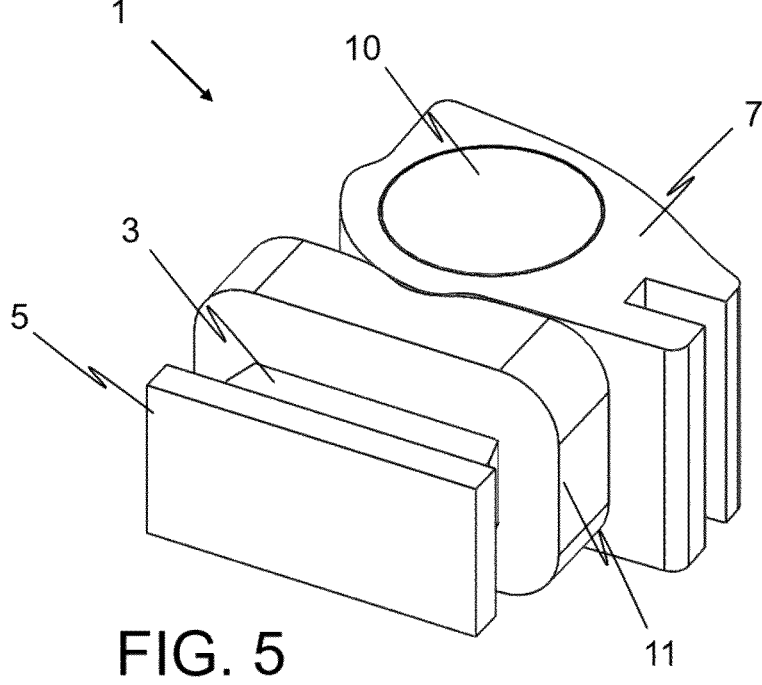
FIG. 5 is a front perspective view of the assembled hinge system of FIG. 3.

Reference is made now to FIG. 4 and FIG. 5, which show an embodiment of an assembled hinge system. The embodiment shows the relation between the different elements of the hinge system when the different elements are assembled in the absence of an eyeglass frame 20.

Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the scope of the present invention.

The invention claimed is:

1. A hinge system for eyeglasses, comprising:
   a first hinge element, comprising a first end and a second end, wherein:
   the first end comprises retention means for retaining the first hinge element; and
   the second end comprises a first hole that extends between two opposite faces of the first hinge element;
   a second hinge element, comprising:
   an aperture for receiving the first hinge element; and
   a second hole that extends from a face of the second hinge element to the aperture,
   wherein the first and second hinge elements are configured such that, when the second end of the first hinge element is arranged extending through the aperture of the second hinge element, the first hole and the second hole are axially aligned with respect to each other, thereby forming a hollow cavity extending through the aligned holes;
   the hinge system further comprising:
   a pin configured to be at least partially engaged in the hollow cavity; and
   a lamellar element, comprising an aperture configured for insertion of the second end of the hinge element, wherein when at least a part of the lamellar element is between the retention means and the second hinge element, a surface of the lamellar element is configured to make sliding contact with a periphery of the second hinge element, wherein said surface comprises a surface depression defined in said surface and configured to receive a portion of the periphery of the second hinge element therein;
   wherein the periphery of the second hinge element comprises a curved surface extending between two respective end portions and being configured to make sliding contact with the surface of the lamellar element, the periphery of the second hinge element further comprising two lateral sections, wherein the curved surface is arranged between the two lateral sections along the periphery of the second hinge element, and wherein the curved surface is configured such that at least the two end portions of the curved surface protrude from said lateral sections radially with respect to a central axis of the second hole; and wherein the end portions of the curved surface are configured to form-fit together with the surface depression, such that, when the second hinge element is rotated around the pin and reaches an extended position, one of the end portions is received within the surface depression, and, such that, when the second hinge element is rotated around the pin and reaches a folded position, the other end portion is received within the surface depression.

2. The hinge system according to claim 1, wherein the pin is made of a polyamide.

3. The hinge system according to claim 1, wherein the lamellar element is an elastic lamellar element made of a polyamide.

4. The hinge system according to claim 1, wherein the second hinge element comprises an additional hole for receiving at least partially the pin, wherein the additional hole is configured such that, when the second end of the first hinge element is arranged extending through the aperture of the second hinge element, the first hole, the second hole and the additional hole are axially aligned.

5. The hinge system according to claim 1, wherein opposite faces of the first hinge element are substantially parallel to each other, and wherein the retention means are configured as a base comprising at least a part being perpendicular to the opposite faces of the first hinge element.

6. The hinge system according to claim 1, wherein the first hinge element further comprises additional retention means configured as one or more protrusions at least partially distributed on a periphery of the first hinge element, wherein said protrusions are configured to point towards the retention means.

7. The hinge system according to claim 1, wherein the surface depression is configured as a curved surface having a radius of curvature being smaller than a radius of curvature of a portion of the curved surface being arranged between the two respective end portions of the curved surface.

8. The hinge system according to claim 7, wherein the radius of curvature of the curved surface of the surface depression is configured to engage with the end portions of the curved surface.

9. The hinge system according to claim 1, wherein the curved surface extends around a central axis of the second hole covering an angle in the range 70 to 110 degrees, or wherein the two lateral sections are at least partially perpendicular to each other.

10. The hinge system according to claim 1, wherein the pin comprises a first part and a second part, wherein the first part has a cross-section which is larger than a cross-section of the second part.

11. The hinge system according to claim 10, wherein the second hinge element comprises an indentation configured for lodging the first part of the pin.

12. An eyeglass frame comprising one or two hinge systems according to claim 1, wherein, for each hinge system, the eyeglass frame comprises:

an aperture configured as a through-hole extending from a front part of the frame to a rear part of the frame, and further configured for inserting the first end and the second end of the respective first hinge element up to the retention means; and a temple configured to be attached to or be an integral part of the respective second hinge element.

13. The eyeglass frame according to claim 12, wherein each aperture further comprises a rear recess arranged in the rear part of the frame and configured to insert at least partially the respective lamellar element, such that the lamellar element is prevented from passing through the respective aperture towards the frontal part of the frame.

14. The eyeglass frame according to claim 13, wherein each rear recess and each lamellar element are configured such that, when a lamellar element in received the respective rear recess, said lamellar element is prevented from rotating within said rear recess.

15. The eyeglass frame according to claim 12, wherein each aperture further comprises a frontal recess arranged in the frontal part of the frame and configured to insert and contact with the retention means, such that the retention means are prevented from passing through the respective aperture towards the rear part of the frame when the respective first hinge element is inserted through the respective aperture.

16. A method of assembly of a hinge system according to claim 1, in an eyeglass frame that comprises:

an aperture configured as a through-hole extending from a front part of the frame to a rear part of the frame, and further configured for inserting the first end and the second end of the respective first hinge element up to the retention means; and a temple configured to be attached to or be an integral part of the respective second hinge element;

the method comprising the steps of:

inserting the second end of the first hinge element through the aperture of the eyeglass frame;

inserting the second end of the first hinge element through the aperture of the lamellar element;

axially aligning the first and the second hole with respect to each other; and inserting the pin through the hollow cavity formed by the first hinge element and the second hinge element, in such a way that the pin remains engaged at least partially in the hollow cavity.

17. The method of assembly according to claim 16, wherein the aperture of the eyeglass frame comprises a rear recess configured to receive at least partially the lamellar element, the method further comprising fitting the lamellar element in the rear recess, after inserting the second end of the first hinge element through the aperture of the frame.

18. The method of assembly according to claim 16, wherein axially aligning the first and the second hole with respect to each other comprises providing a compression force against the surface of the lamellar element.

\* \* \* \* \*